(12) United States Patent
Magno, Jr. et al.

(10) Patent No.: US 8,657,545 B2
(45) Date of Patent: Feb. 25, 2014

(54) STRUT CLAMP

(75) Inventors: Joey D. Magno, Jr., Cordova, TN (US); Robert K. Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 454 days.

(21) Appl. No.: 12/949,180

(22) Filed: Nov. 18, 2010

(65) Prior Publication Data

US 2011/0121153 A1 May 26, 2011

Related U.S. Application Data

(60) Provisional application No. 61/264,266, filed on Nov. 25, 2009.

(51) Int. Cl.
*F16B 21/00* (2006.01)

(52) U.S. Cl.
USPC ........... 411/349; 411/549; 411/552; 248/214; 248/316.1; 403/308.1

(58) Field of Classification Search
USPC .......... 248/237, 214, 220.21, 316.1; 403/408, 403/348, 349, 408.1; 411/349, 549, 552, 411/553; 238/349, 318, 319
See application file for complete search history.

(56) References Cited

U.S. PATENT DOCUMENTS

| | | | |
|---|---|---|---|
| 2,736,272 A | 2/1956 | Elsner | |
| 4,240,129 A * | 12/1980 | Kawazoe | ........................ 362/3 |
| 4,545,697 A | 10/1985 | Verdenne et al. | |
| 4,830,531 A | 5/1989 | Condit et al. | |
| 4,943,182 A | 7/1990 | Hoblingre | |
| 5,209,619 A | 5/1993 | Rinderer | |
| 5,271,586 A | 12/1993 | Schmidt | |
| 5,370,488 A * | 12/1994 | Sykes | ........................ 411/551 |
| 5,516,073 A * | 5/1996 | McMahan | ..................... 248/486 |
| RE36,681 E | 5/2000 | Rinderer | |
| 6,254,303 B1 | 7/2001 | Falat et al. | |
| 6,585,465 B1 | 7/2003 | Hammond et al. | |
| 6,644,901 B2 | 11/2003 | Breckel | |
| 6,726,117 B2 * | 4/2004 | Herb et al. | ..................... 238/315 |
| 6,827,531 B2 | 12/2004 | Womack et al. | |
| 6,872,038 B2 | 3/2005 | Westlake | |
| 7,052,222 B2 | 5/2006 | Muller et al. | |
| 7,070,374 B2 | 7/2006 | Womack et al. | |
| 7,661,984 B2 * | 2/2010 | McMullen et al. | ........... 439/583 |
| 8,181,926 B2 * | 5/2012 | Magno et al. | ................. 248/237 |

* cited by examiner

*Primary Examiner* — Kimberly Wood
(74) *Attorney, Agent, or Firm* — Snyder, Clark, Lesch & Chung, LLP

(57) ABSTRACT

An assembly includes a first structure and a clamp configured to clamp the first structure to a second structure. The clamp may include a top portion configured to extend through the slot, where the top portion includes a head, a neck portion coupled to the head and a cylindrical body coupled to the neck portion. The clamp may also include a rotatable nut located adjacent the slot, where the rotatable nut has an opening to receive the cylindrical body. The clamp may further include a spring nut configured to receive a portion of the cylindrical body. The rotatable nut is configured to be turned such that when the head of the clamp is aligned with the slot in the first structure, the top portion of the clamp is configured to lower into the opening and clamp the first structure to a second structure.

20 Claims, 13 Drawing Sheets

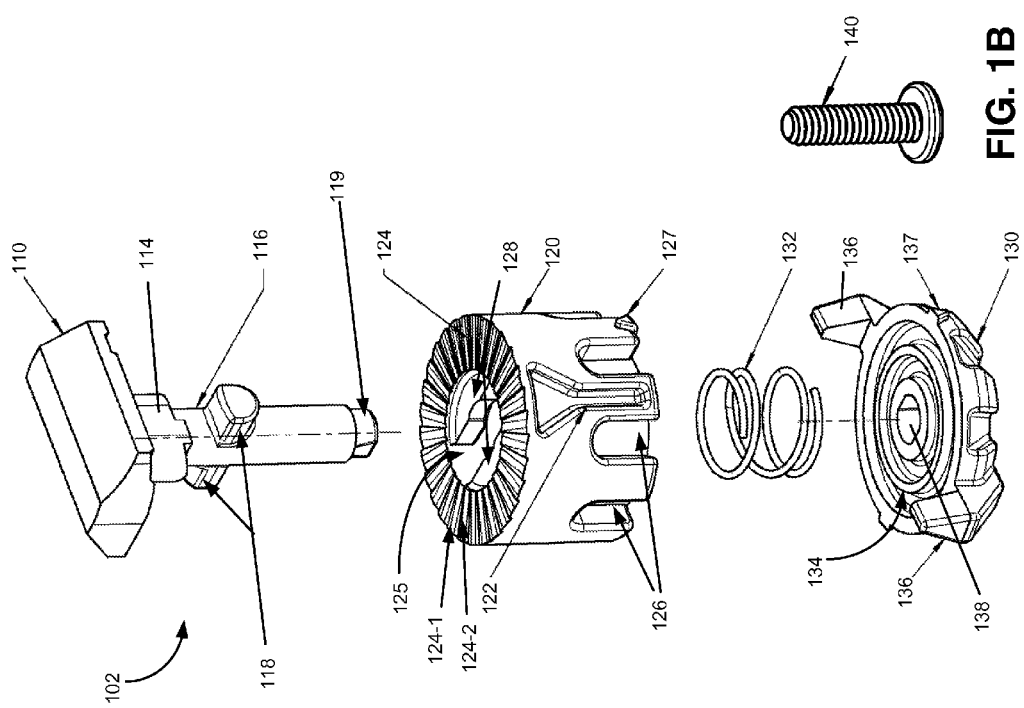

STRUT CLAMP

RELATED APPLICATION

This application claims priority under 35 U.S.C. §119 based on U.S. Provisional Patent Application No. 61/264,266, filed Nov. 25, 2009, the disclosure of which is hereby incorporated herein by reference.

BACKGROUND INFORMATION

U-bolts are frequently used to clamp various structures to one another. For example, a U-bolt may be used to clamp a strut to a mounting base. In such a scenario, the U-bolt requires a clear area on the top of the strut. The U-bolt may then be connected to the mounting base using two nuts and two corresponding washers.

One drawback with using U-bolts in such a manner is that the installer needs to hold the various pieces together while putting the washers and nuts on the threaded portions of the U-bolt. For example, the installer must hold the U-bolt in position with respect to the mounting base and then place the washers and nuts on the threaded portions of the U-bolt. The installer must then turn the nuts, often while in an awkward position (e.g., upside down), to tighten the nuts onto the U-bolt. Performing these tasks is often time consuming and cumbersome.

BRIEF DESCRIPTION OF THE DRAWINGS

FIG. 1B is an exploded view of the strut clamp of FIG. 1A

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein provide a clamp that that may be used in combination with a mounting base to clamp the mounting base to another structural member, such as a strut. In an exemplary implementation, the clamp may be pre-installed to the mounting base. The clamp may include a clamping head and a rotatable nut. The structural member to be clamped to the mounting base may be lowered over the clamping head and an installer may turn the rotatable nut to tighten the clamp. In this manner, the installer may save considerable time with respect to clamping structural members together.

Figure 1A:
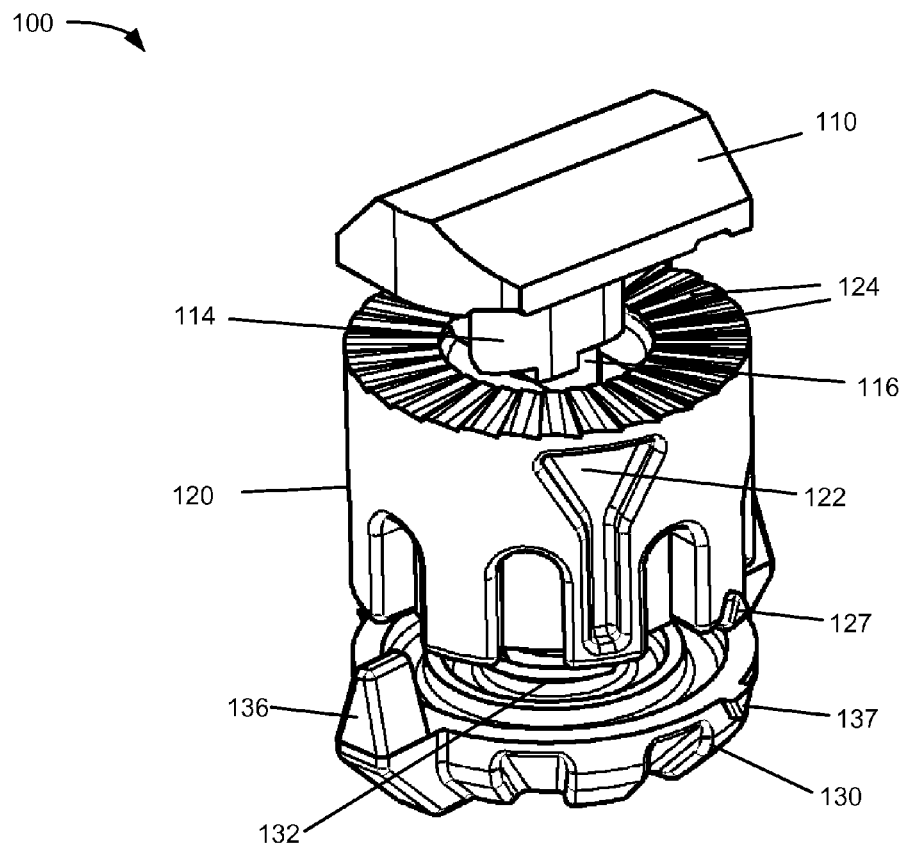
FIG. 1A is an isometric view of a strut clamp consistent with an exemplary implementation.

FIG. 1A is an isometric view of an exemplary clamp assembly 100 (also referred to as strut clamp assembly 100 or strut clamp 100) and FIG. 1B is an exploded view of the strut clamp assembly 100 of FIG. 1A, consistent with embodiments described herein. Referring to FIG. 1A, strut clamp 100 includes clamping head 110, neck portion 114, bolt 116, clamping nut 120 (also referred to herein as cam nut 120), gauge mark 122, serrations 124, spring nut 130, retaining spring 132 and spring nut screw 140. In an exemplary implementation, the components illustrated in FIG. 1A may be fabricated out of metal, such as steel (e.g., galvanized steel), aluminum or some other metal. In other implementations, all or some of the components illustrated in FIG. 1A may be fabricated using other materials, such as plastic or composite materials.

Clamping head 110, neck portion 114 and bolt 116 (also referred to herein as bolt body 116 or shank 116) may be connected to one another and/or formed as a unitary structure. For example, FIG. 1B illustrates clamping head 110, neck portion 114 and bolt 116 connected together to form a T-shaped structure, collectively referred to herein as a T-bolt 102. T-bolt 102 may be inserted into an opening in clamping nut 120. For example, referring to FIG. 1B, T-bolt 102 may be inserted into an oval-shaped opening or bore 125 in a center portion of clamping nut 120. Bolt 116 may include pins 118 located on either side of bolt 116 that are retained in opening 125, as described in more detail below.

For example, clamping nut 120 may include collar 128 located adjacent opening 125 that is configured to allow pins 118 to drop into opening 125 and abut collar 128. In an exemplary implementation, collar 128 includes a pair of helical or inclined surfaces located below the upper surface of collar 128, described in more detail below, that contact the top surface of pins 118. Pins 118 may contact these helical surfaces such that when clamping nut 120 is turned, T-bolt 102 will move in the downward direction and provide a downward clamping force adequate to hold a structure, such as a strut, in place even under adverse conditions (e.g., high uplift wind loads).

In addition, the lower portion of bolt 116 may include a cylindrical portion 119 that has a smaller diameter than the upper portion of bolt 116. Bolt 116 may engage retaining spring and the lower portion 119 of bolt 116 may extend through retaining spring 132. That is, retaining spring 132 may encircle or surround bolt 116 when T-bolt 102 is inserted into bore 125 and lower portion 119 may extend through retaining nut 130. The lower portion of bolt 119 may also be threaded to receive mating threads of spring nut screw 140.

Referring back to FIG. 1A, clamping nut 120 may include gauge marks 122 (one shown in FIG. 1A), serrations 124 and alignment arrows 127 (one shown in FIG. 1A). Gauge marks 122 located on either side of cam nut 120 may align with alignment arrows 136 located on either side of spring nut 130 when strut clamp 100 is in the clamped position, as described in more detail below. Alignment arrows 127 located on either side of cam nut 120 may align with alignment arrows 137 of spring nut 130 when strut clamp 100 is in the unclamped position. Gauge marks 122 and alignment arrows 136 may be used during installation to ensure that clamping head 110 is properly aligned when strut clamp 100 is connected to a structural member in the clamped position, as described in more detail below.

Serrations 124 located on the top surface of clamping nut 120 may include a number of relatively flat, angled surfaces that are serrated or stepped with respect to one another. For example, referring to FIG. 1B, the portion of surface 124-2 that is adjacent surface 124-1 may be raised by some height (e.g., 1/32 of an inch) with respect to surface 124-1. It should be understood that other distances/heights may be used between adjacent serrations 124. In each case, serrations 124 help ensure that clamping head 110 does not slip when strut clamp 100 is in the clamped or locked position, as described in more detail below.

Spring nut 130 may include a nut with an opening 134 to receive and retain retaining spring 132. In some implementations, spring nut 130 may also include a retaining slot (not shown) that helps ensure that retaining spring 132 stays in place within opening 134. Spring nut 130 may also include a second central opening 138 that has a smaller diameter than opening 134. The lower portion of bolt body 116 may extend through clamping nut 120 and retaining spring 132 may surround bolt body 116. This may help hold T-bolt 102 and apply upward tension to the lower surface of collar 128 when T-bolt 102 is inserted into clamping nut 120. In addition, in an exemplary implementation, the lower portion 119 of T-bolt 102 may extend through central opening 138. In an exemplary implementation, T-bolt 102 may be secured to spring nut 130 via spring nut screw 140. For example, spring nut screw 140 may extend through opening 140 of spring nut 130 and the threads of spring nut screw 140 may mate with corresponding threads inside the lower portion 119 of T-bolt 102. This ensures that spring nut 130 does not come loose from clamp assembly 100.

In other implementations, instead of using spring nut 130 illustrated in FIG. 1B, the bottom nut may be a conventional nut and a flat washer that may be used to retain a spring. In either case, the bottom nut (e.g., spring nut 130) may be secured to clamp assembly 100 to help hold T-bolt 102 in place.

Cam nut 120 may rotate to clamp elements together. For example, an installer may turn cam nut 120 in a counterclockwise direction to effectively position clamp assembly 100 in the clamped position, as described in detail below. In an exemplary implementation, cam nut 120 may include indentations 126 located around the circumference of clamping nut 120, as illustrated in FIG. 1B. Indentations 126 may be substantially rounded rectangular-shaped openings that facilitate gripping of cam nut 120 via a tool (e.g., a spanner wrench) or by hand.

Cam nut 120, as described above, may include alignment arrows 127 that align with alignment arrows 137 on spring nut 130 when cam nut 120 and spring nut 130 are initially connected to one another. After an installer rotates cam nut 120 to clamp various structures together, gauge marks 122 and alignment arrows 136 will be aligned, as described in more detail below.

Figure 2A:
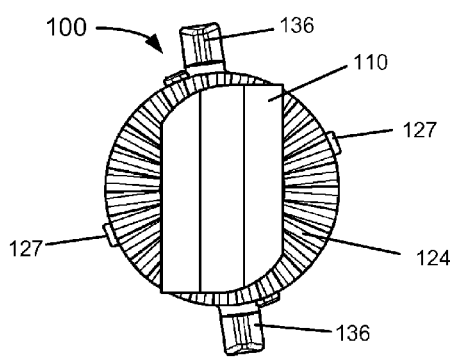
FIGS. 2A, 2B and 2C are a top view, front view and side view, respectively, of the strut clamp of FIG. 1A according to an exemplary implementation.
Figure 2B:
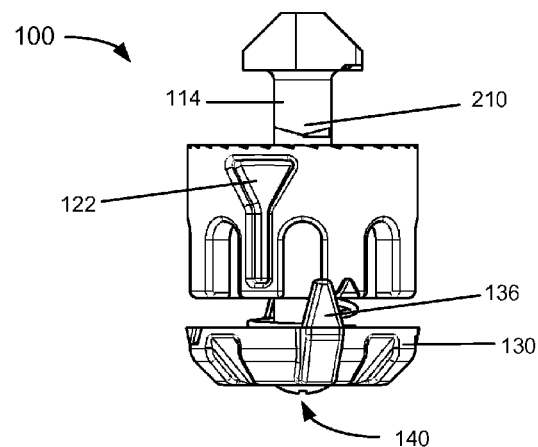
Figure 2C:
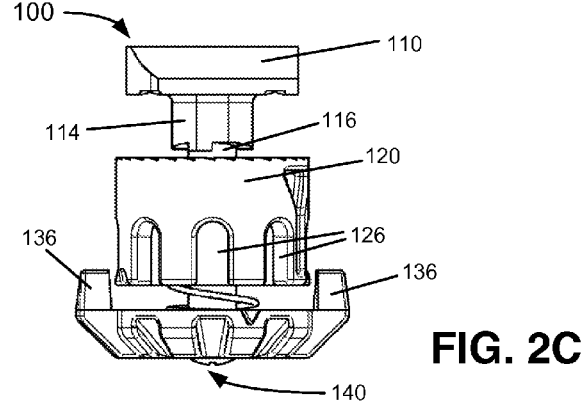

FIGS. 2A, 2B and 2C illustrate top, front and side views, respectively, of clamp assembly 100. As illustrated in FIG. 2A, clamping head 110 may have a parallelogram-like shape that permits clamping head 110 to move in a counterclockwise direction when clamping nut 120 is being rotated to clamp two structural members, as described in detail below. Referring to FIG. 2B, gauge mark 122 and alignment arrow 136 are not aligned, indicating that clamp assembly 100 is in the unclamped state. As illustrated in FIG. 2B, neck portion 114 includes a "V" shaped feature or portion 210. When clamping nut 120 is turned, neck portion 114 may also turn and eventually line up with a slot in an element to be clamped, such as a mounting base (not shown in FIGS. 2A-2C). When this occurs, pins 118 may thread onto the surfaces below collar 128 and T-bolt 102 will drop as clamping head 110 is turned to clamp the components (e.g., a strut to the mounting base). As also illustrated in FIG. 2B, the spring nut screw 140 may extend through the bottom portion of spring nut 130 when clamping assembly 100 is installed.

Figure 2D:
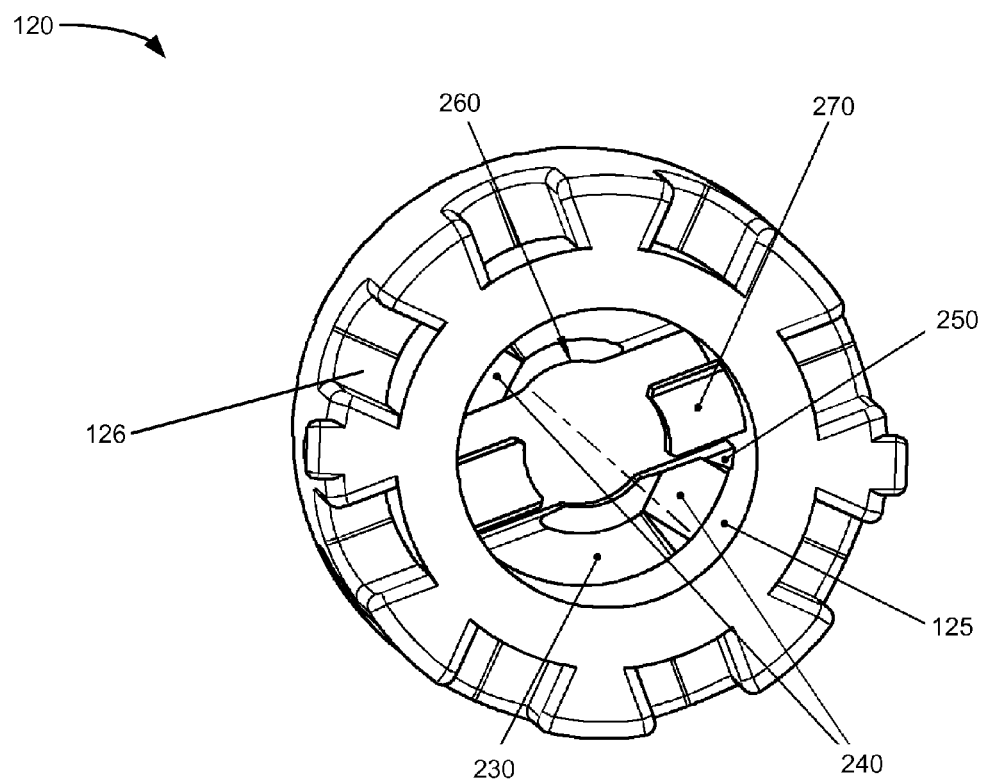
FIG. 2D is a bottom side view of the cam nut of FIG. 1A according to an exemplary implementation.

FIG. 2D illustrates a bottom side view of clamping nut 120. Referring to FIG. 2D, clamping nut 120 may include inclined or helical surfaces 230 located on the lower surface of collar 128. These inclined or helical surfaces 230 permit clamping nut 120 to gradually tighten to a lower surface of a structure to which clamping assembly 100 is mounted when clamping nut 120 is rotated. Clamping nut 120 also includes detented surfaces 240 located on either side of bore 125. Detented surfaces 240 retain or lock pins 118 of T-bolt 102 in place when clamping assembly 100 is in the clamped position. Detented surfaces 240 also ensure that clamp assembly 100 will not become easily loosened by an outside force without the use of a tool (e.g., a spanner wrench).

Clamping nut 120 also includes a positive stop 250 to prevent clamping nut 120 from being over-tightened. Positive stop 250 may also prevent T-bolt 102 from eventually losing its clamping force by over-tightening. Clamping nut 120 may further include radiused edges 260 located on the sides of collar 128. Radiused edges 260 may help maintain concentric positioning of the upper and lower portions of T-bolt shank 116. Clamping nut 120 further includes lower extensions or stems 270 that may be used to compress retaining spring 132 against spring nut 130.

Figure 2E:
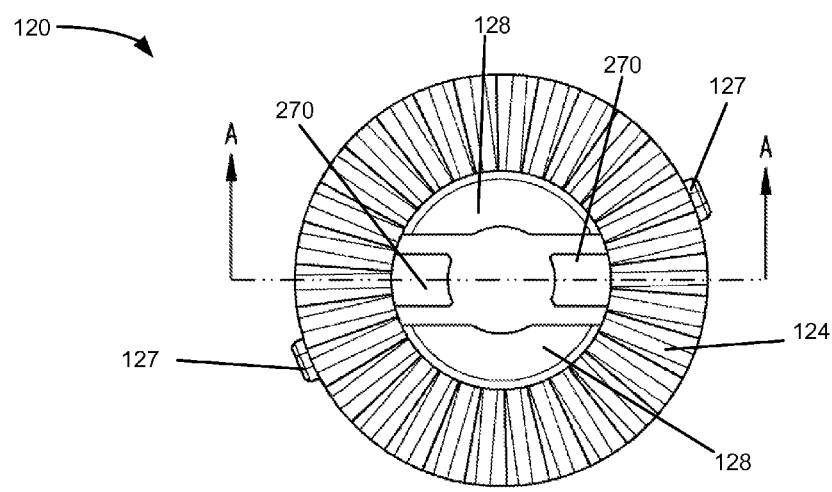
FIGS. 2E and 2F are a top view of the cam nut and a sectional view of the cam nut, respectively, of FIG. 1A according to an exemplary implementation.
Figure 2F:
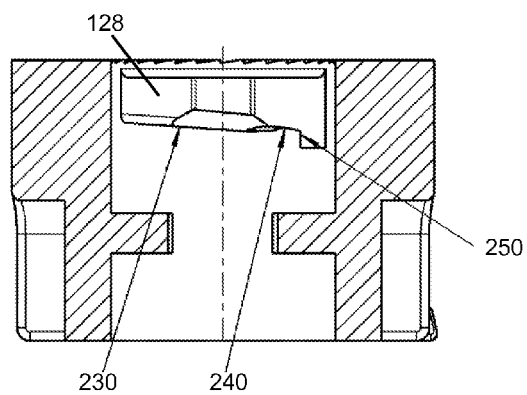

FIG. 2E illustrates a top view of clamping nut 120. As illustrated, stems 270 extend from the sides of bore 125 and collar 128 forms an opening to receive shank portion 116 of T-bolt 102. FIG. 2F illustrates a cross-sectional view of clamping nut 120 taken along the line AA in FIG. 2E. Referring to FIG. 2F, inclined or helical surfaces 230 located on the lower portion of collar 128 are shown. As described above, surfaces 230 may be used to apply a downward clamping force on pins 118 of T-bolt 102 when clamping nut 120 is rotated. This downward clamping force may be adequate to hold a structure to which clamping assembly 100 is connected in place under a variety of conditions, including high uplift wind conditions. FIG. 2F also illustrates detented surface 240 and stop 250. Detented surfaces 240, as described above, may be used to retain or lock clamping nut 120 and T-bolt 102 in a fully clamped position when clamping nut 120 is turned such that gauge marks 122 and alignment arrows 136 are aligned.

Figure 3:
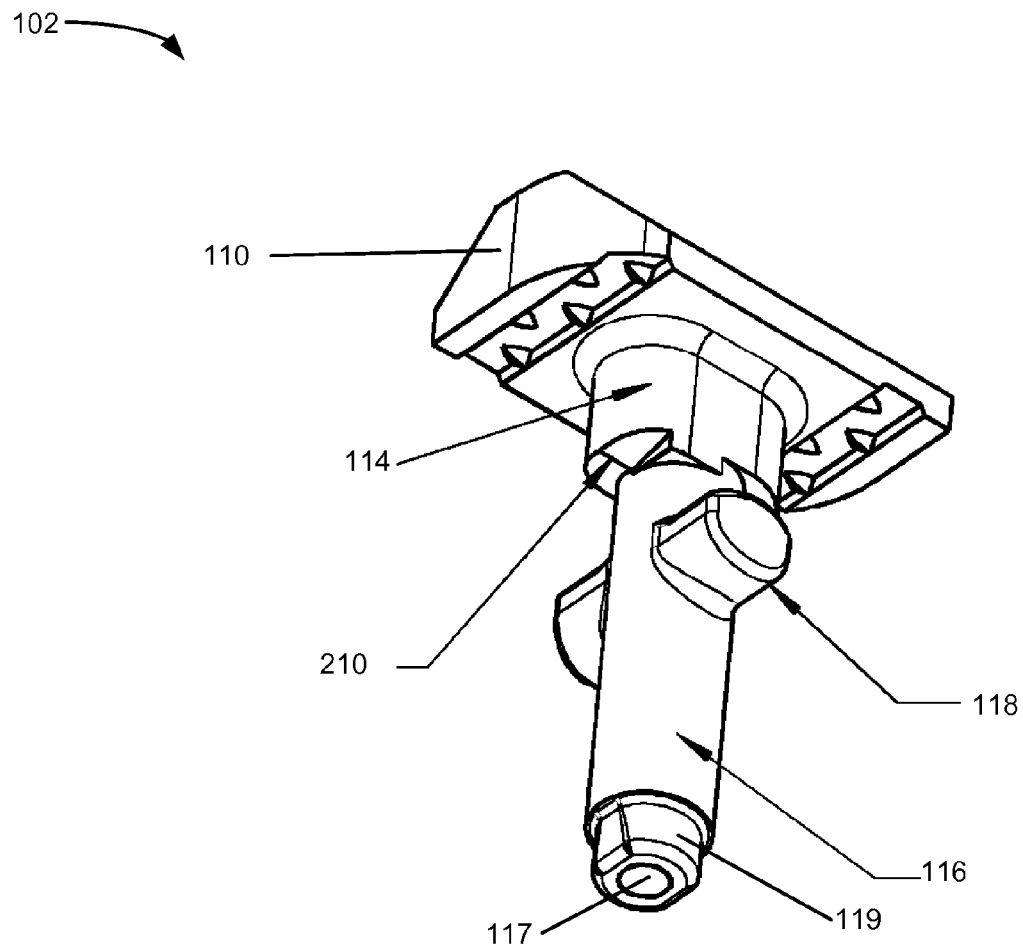
FIG. 3 is a perspective view of the T-bolt portion of the strut clamp of FIG. 1A.

FIG. 3 is an isometric view of T-bolt 102 taken from a perspective below clamping head 110. Referring to FIG. 3, as described previously, in an exemplary implementation, the lower portion 119 of T-bolt 102 has a smaller diameter than shank 116. For example, in one implementation, the lower portion 119 may have a diameter of approximately one quarter of an inch (¼") and the upper portion of T-bolt 102 (i.e., shank 116) may have a diameter of approximately one half of an inch (½"). This enables the lower portion 119 of T-bolt 116 to extend through central opening 138 of spring nut 130. As described above, spring nut screw 130 may be secured to the lower portion 119 of T-bolt via a threaded connection. For example, the lower portion 119 of T-bolt 102 may include opening 117 that is threaded. The internal threads inside opening 117 will mate with the threads of spring nut screw 140 to secure spring nut 130 to clamping nut 120 and T-bolt 102.

As also illustrated in FIG. 3, the V-shaped portions 210 of neck 114 may be located traverse or approximately offset by 90 degrees in the axial direction with respect to pins 118. The V-shaped portion 210 may rest in corresponding notches or grooves in a mounting base to which clamping assembly 100 may be coupled. For example, as described above, clamp assembly 100 may be used to couple a structure, such as a mounting base, to another support structure, such as framing structure.

Figure 4A:
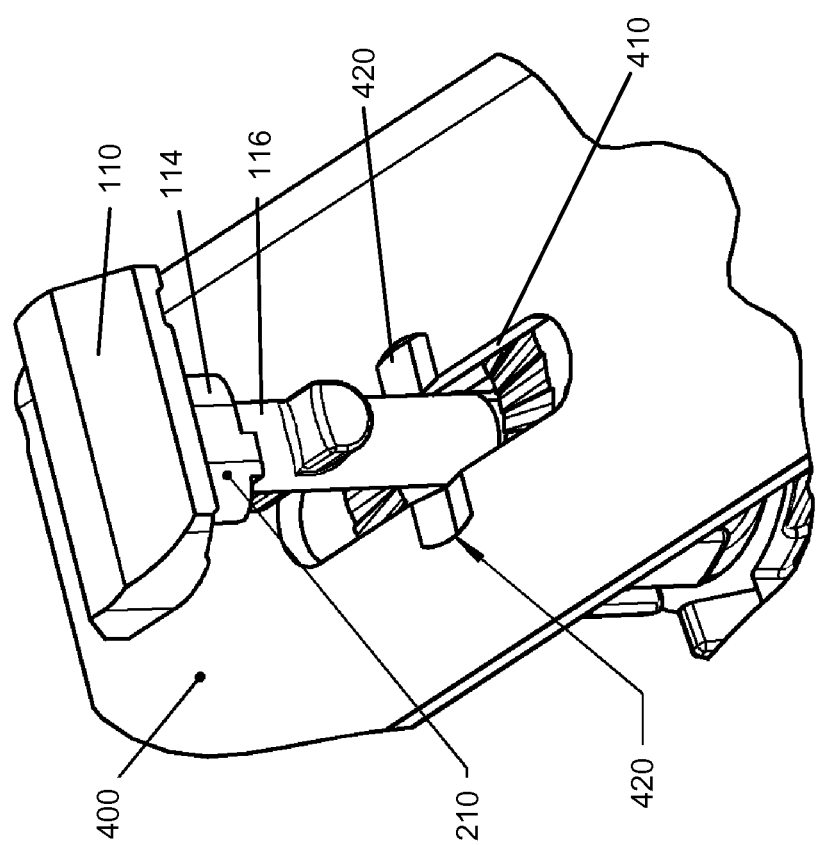
FIGS. 4A and 4B are perspective views of the strut clamp of FIG. 1A connected to a mounting structure.
Figure 4B:
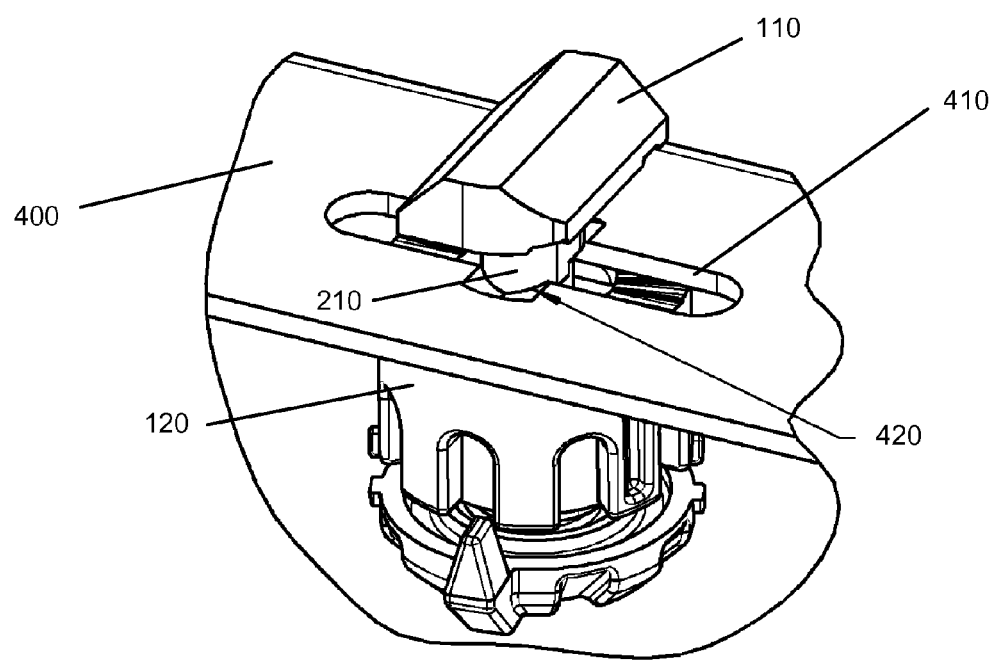

For example, FIGS. 4A and 4B illustrates clamp assembly 100 connected to mounting base 400. In an exemplary implementations, mounting base 400 may be a pier cap associated with one or more piers or structural columns that support a number of framing channels or struts. In an exemplary implementation, the struts (not shown in FIGS. 4A and 4B) may support a solar table assembly that includes a number of solar panels. It should be understood, however, that mounting base 400 may be associated with any type of structural member.

In each case, as described above, neck portion 114 of T-bolt 102 may include V-shaped portions 210 located on either side of neck 114. Mounting base 400 may include a slot 410 through which clamp assembly 100 may extend. For example, referring to FIG. 4A, clamping nut 120 may be located below mounting base 400 and bolt 116 may extend through slot 410. Mounting base 400 may also include "V" shaped notches or depressions 420 located on either side of slot 410. Notches 420 in mounting base 400 may be designed to receive the V-shaped portions 210 of neck 114 upon clamping of clamp assembly 100 to mounting base 400.

For example, FIG. 4B illustrates V-shaped portion 210 being retained in notch 420. The other V-shaped portion 210 located opposite the V-shaped portion 210 illustrated in FIG. 4B may be similarly retained in the corresponding notch 420 located on the opposite side of slot 410. In this manner, mounting base 400 may be designed in conjunction with clamping assembly 100 to retain T-bolt 102.

Although T-bolt 102 is illustrated as including V-shaped portions 210 that are retained in corresponding V shaped notches 420, it should be understood that alternative structures may be used to retain T-bolt to mounting base 400. For example, in other implementations, mounting base 400 may include any type of detent or depression stamped or formed in mounting base 400. In such an implementation, T-bolt 102 may include corresponding structures located on either side of neck portion 114 that are received by the detent structures on mounting base 400 and are used to hold T-bolt 112 in place with respect to mounting structure 400. In each case, T-bolt 112 may be retained in an opening/slot (e.g., slot 410) and held in place so that clamping head 110 is not loose with respect to mounting base 400.

In an exemplary implementation, mounting base 400 and clamp assembly 100 may be pre-assembled prior to shipment to a work site. In such instances, clamp assembly 100 may shipped in the configuration illustrated in FIG. 4A or 4B. This may help save significant time with respect to clamping another structural member to mounting base 400.

Figure 5:
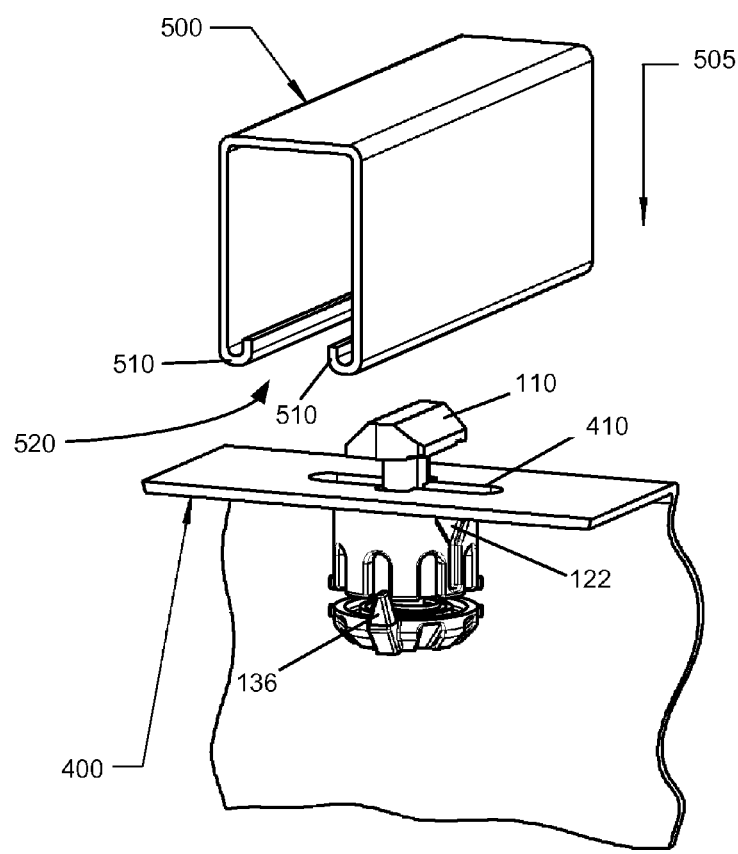
FIG. 5 illustrates a structural member that may be clamped to the mounting structure of FIG. 4A.

In an exemplary implementation, mounting base 400 may be clamped to a framing structure, such as a framing channel or strut structure. As an example, FIG. 5 illustrates a structural member to which mounting base 400 may be clamped. Referring to FIG. 5, in an exemplary implementation, framing structure 500, also referred to herein as strut 500, may be a framing element fabricated using metal, plastic or some composite material. In one implementation, a large number of struts 500 may form a structure (sometimes referred to as a table) upon which solar panels may be mounted.

Strut 500 may have a substantially C-shaped cross sectional shape, as illustrated in FIG. 5. The sides of strut 500 may also include J-shaped extensions 510, also referred to as lips or rims 510, that extend from the sides of strut 500, as also illustrated in FIG. 5. Extensions 510 may contact clamping head 110 when strut assembly 110 is in the clamped position with respect to strut 500, as described in detail below.

In an exemplary implementation, the lower portion of strut 500 may form an opening 520 to receive clamping head 110. For example, the area between extensions 510 may form opening 520. Strut 500 may be lowered to mounting base 400 such that opening 520 is positioned over clamping head 110. In an exemplary implementation, clamping head 110 may be sized such that clamping head 110 may fit in opening 520 when strut 500 is lowered onto mounting base 400, as illustrated by arrow 505. The dimensions of opening 520 may be suitable for receiving clamping head 110. In addition, in some implementations, clamping head 110 may be sized based on the particular structure (e.g., strut 500) with which clamping assembly 100 is to be used.

Figure 6:
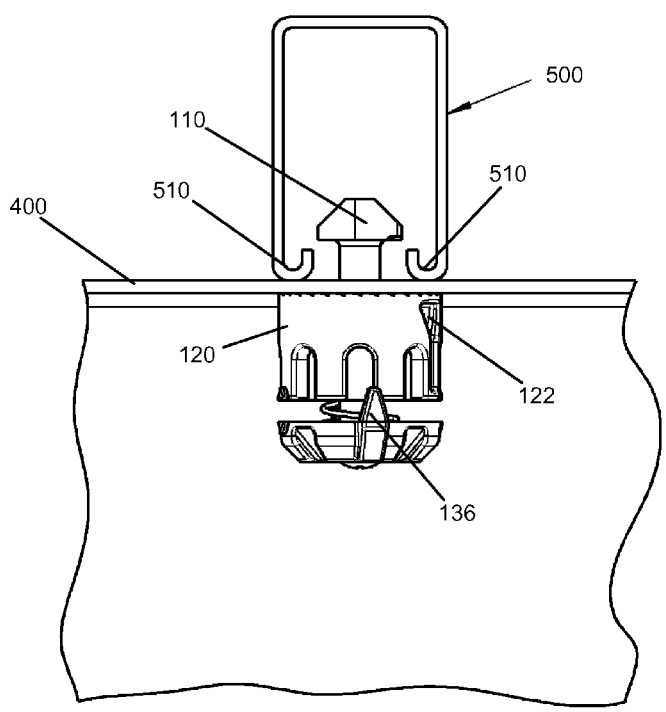
FIG. 6 illustrates the structural member, strut clamp and mounting base of FIG. 5 with the strut clamp in an unclamped position.

FIG. 6 illustrates strut clamp 100 connected to mounting base 400 with strut 500 lowered onto mounting base 400. In this example, strut clamp 100 is shown in the initial or unclamped position. As illustrated, strut 500 has been lowered onto mounting base 400 such that the length of clamping head 110 is essentially parallel to extensions 510. In the initial unclamped position illustrated in FIG. 6, clamping head 110 may not contact extensions 510 and gauge mark 122 is not aligned with alignment arrow 136. In this position, strut 500 is not clamped to mounting base 400.

Figure 7:
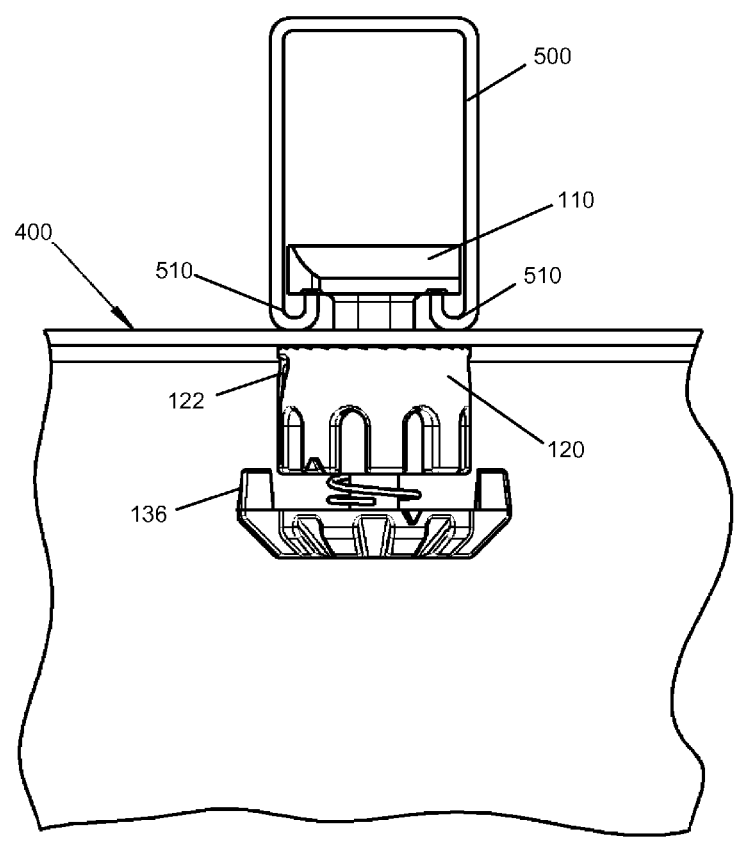
FIG. 7 illustrates the structural member, strut clamp and mounting base of FIG. 5 with the strut clamp in a clamped position.

FIG. 7 illustrates strut clamp assembly 100 installed in the clamped position. For example, as discussed above, an installer may turn clamping nut 120 illustrated in FIG. 6 in the counterclockwise direction. In one implementation, the installer may turn clamping nut 120 approximately 180 degrees in the counterclockwise direction. As described and illustrated above with respect to FIGS. 2A and 5, the shape of clamping head 110 may allow clamping head 110 to turn in the counterclockwise direction within opening 520 of strut 500. As a result of turning clamping nut 120, neck 114 and clamping head 110 will also rotate and eventually line up with slot 410 (FIG. 5). That is, clamping head 110, which is initially perpendicular to slot 410 as shown in FIGS. 4A and 5, will be parallel with or aligned with the length of slot 410 when clamping nut 120 is turned approximately 180 degrees in the counterclockwise direction.

When clamping head 110 is aligned with slot 410, T-bolt 102 will drop and clamp strut 500 to mounting base 400. In the clamped position, lip 510 of strut 500 contacts clamping head 110, as also illustrated in FIG. 7. Gauge marks 122 may also align with alignment arrows 136. In an exemplary implementation, clamping nut 120 may have an aggressive slope to drive pins 118 and V-shaped portions 210 of T-bolt 102 in the downward direction and lock strut 500 against mounting base 400. For example, as described above, collar 128 may include a pair of surfaces below the upper surface of collar 128. Pins 118 will thread onto the pair of surfaces in order to move T-bolt 102 downwards at a rate larger than that obtained using conventional threads.

As also discussed above, V-shaped portions 210 may be received by notches 420 to ensure that T-bolt 102 is secure within clamping nut 120. In the clamped configuration, spring 132 may provide an upward biasing force on the bottom side of collar 128 (FIG. 1B) to help maintain clamp assembly 100 in the clamped position. As further discussed above, serrations 124 may help ensure that clamping nut 120 does not slip with respect to the clamped structures (e.g., mounting base 400 and strut 500).

Figure 8:
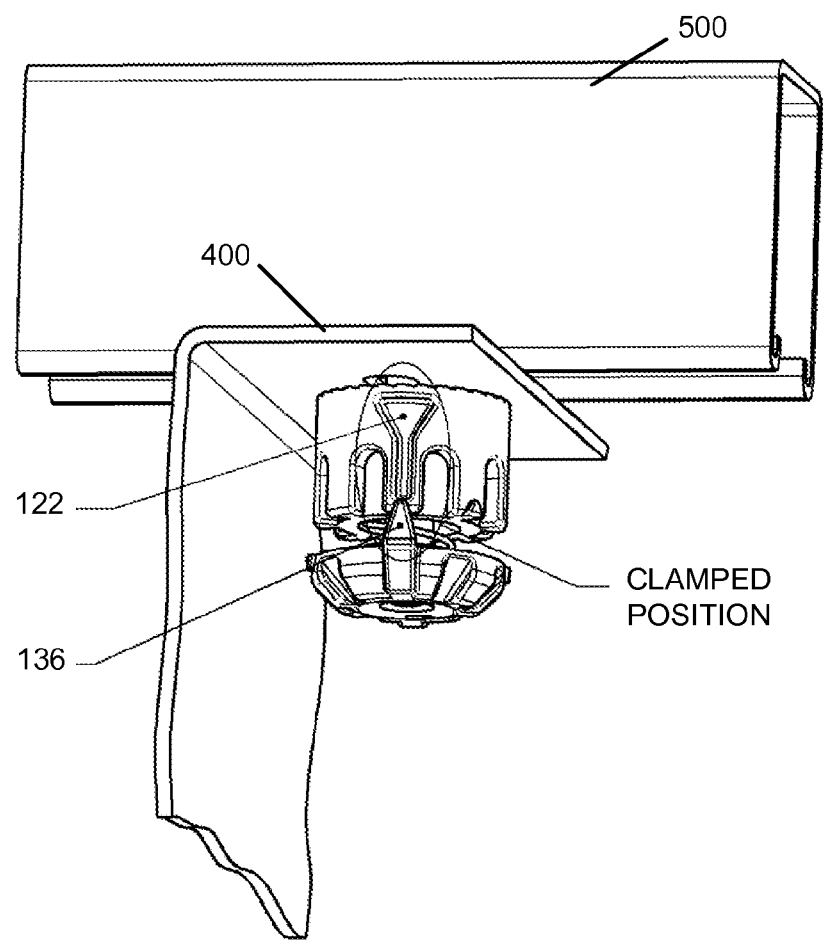
FIG. 8 illustrates an additional view of the structural member, strut clamp and mounting base with the strut clamp in the clamped position.

FIG. 8 illustrates an additional view of clamp assembly 100 in the clamped position. As discussed above with respect to FIG. 7, in the clamped position, the lower portion of clamping head 110 contacts rims 510. Referring to FIG. 8, in the clamped position, gauge mark 122 is aligned with alignment arrow 136. An installer may use gauge mark 122 and alignment arrow 136 to determine when clamp assembly 100 is in the clamped position. For example, when gauge marks 122 located on either side of clamping nut 120 are aligned with alignment arrows 136, clamp assembly 100 is in the clamped and locked position such that strut 500 is clamped to mounting base 400.

Figure 9:
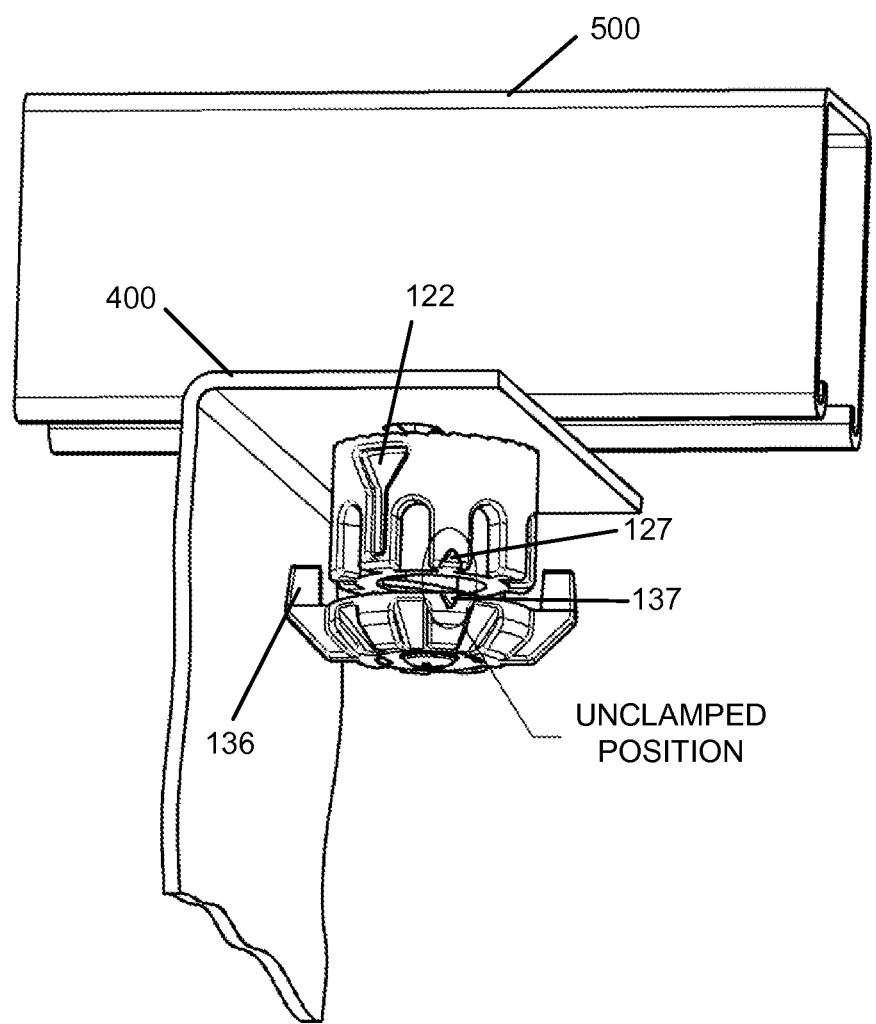
FIG. 9 illustrate additional views of the structural member, strut clamp and mounting base with the strut clamp in an unclamped position.

FIG. 9 illustrates an additional views of clamp assembly 100 in the unclamped position. As discussed above with respect to FIG. 6, in the unclamped or initial position, the length of clamping head 110 is arranged parallel to opening 520 in strut 500. As a result, the lower portion of clamping head 110 does not contacts rims 510. Referring to FIG. 9, in the unclamped position, gauge mark 122 is not aligned with alignment arrow 136, as illustrated in FIG. 9B. This position of clamp assembly 100 corresponds to unclamped position.

To uninstall or return clamp assembly 100 from the clamped position to the unclamped position, the installer may rotate clamp nut 120 illustrated in FIG. 8 in a clockwise direction until alignment arrow 127 located on the lower portion of clamping nut 120 aligns with alignment arrow 137 located on the upper portion of spring nut 130, as illustrated in FIG. 9. The installer may then push spring nut 130 upwards and continue to rotate spring nut approximately 90 degrees in the clockwise direction. Such rotation of spring nut 130 will place T-bolt 102 into an initial or uninstalled position. In this manner, gauge marks 122, alignment arrows 127, alignment arrows 136 and alignment arrows 137 may be used to aid an installer to determine when clamp assembly 100 is in the installed/locked position or the uninstalled position. This may allow an installer to save significant time during installation or when a portion of the installation needs to be un-installed.

As discussed above, in some implementations, clamp assembly 100 may be pre-installed in mounting base 400, as illustrated in FIG. 4A or 4B. As a result, no assembly in the field is required with respect to connecting strut clamp assembly 100 to mounting base 400. In other instances, strut clamp 100 illustrated in FIG. 1A may be provided separately from mounting base 400 and installed onto mounting base 400 or some other mounting base in the field. In such instances, T-bolt 102 may be removed from clamping nut 120 and installed into clamping nut 120 through slot 410, as shown in FIG. 4A.

In either case, clamp assembly 100 saves considerable time with respect to clamping various structures together, such as mounting base 400 and strut 510. That is, an installer may simply turn clamping nut 120 to clamp the elements together, as opposed to using a U-bolt that requires individually tightening nuts onto the U-bolt.

Although not described in detail above, in some implementations, clamp assembly 100 may be larger than conventional clamps and may be easily visible to an installer. For example, in one implementation, clamping nut 120 may have a height ranging from approximately three inches to approximately five inches and a diameter ranging from approximately 1.5 inches to approximately two inches. This may make it very easy for an installer to locate various clamp assemblies 100 when a large number of clamp assemblies 100 are being used to mount a large structure (e.g., a solar table). It should be understood, however, that these sizes are exemplary only and clamping nut 120 may have other sizes based on the particular structures with which clamp assembly 100 may be used.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to clamp assembly 100 clamping a mounting base to a strut assembly. In other implementations, clamp assembly 100 may clamp other structures together.

In addition, features have been described above with respect to clamp assembly 100 pre-fabricated or pre-assembled with one of the mounting structures (e.g., mounting base 400). In such implementations, clamp assembly 100 may be sold as a pre-assembled structure with one of the mounting structures (e.g., mounting base 400). An installer may then simply attach the other structural member as discussed above with respect to FIGS. 6 and 7.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A clamp configured to clamp a first structure to a second structure, the clamp comprising:
   a top portion configured to extend through a slot in the first structure, the top portion including a head, a neck portion coupled to the head and a cylindrical body coupled to the neck portion,
   a rotatable nut located adjacent the slot, the rotatable nut having an opening to receive the cylindrical body, and
   a spring nut configured to receive a portion of the cylindrical body,
   wherein the rotatable nut is configured to be turned such that when the head of the clamp is aligned with the slot in the first structure, the top portion of the clamp is configured to lower into the opening and clamp the first structure to the second structure, and
   wherein the neck portion includes first and second portions located on opposite sides of the neck portion, and wherein the first structure includes notches located on either side of the slot, the notches being configured to receive the first and second portions of the neck portion when the first structure is clamped to the second structure.

2. The clamp of claim 1, wherein the first structure comprises a pier cap configured to support the second structure and the second structure comprises a strut configured to support one or more solar panels.

3. The clamp of claim 1, wherein the rotatable nut includes a first visual indicator and the spring nut includes a second visual indicator, wherein the first and second visual indicators are aligned when the first structure is clamped to the second structure.

4. The clamp of claim 1, wherein the head of the clamp is configured to be positioned substantially perpendicular to the slot in the first structure when the first structure is not clamped to the second structure.

5. The clamp of claim 1, wherein the second structure includes a lip or curved area and wherein the head of the clamp is configured to contact the lip or curved area when the first structure is clamped to the second structure.

6. The clamp of claim 1, wherein the rotatable nut comprises a cylindrical body with a plurality of indentations located around an outer circumference of the rotatable nut.

7. The clamp of claim 6, wherein the rotatable nut is configured to be rotated approximately 180 degrees to clamp the first structure to the second structure.

8. The clamp of claim 1, wherein the spring nut includes a spring located in a central portion of the spring nut, the spring surrounding at least a portion of the cylindrical body and providing a biasing force on the top portion of the clamp.

9. A clamp configured to clamp a first structure to a second structure, the clamp comprising:
a top portion configured to extend through a slot in the first structure, the top portion including a head, a neck portion coupled to the head and a cylindrical body coupled to the neck portion,
a rotatable nut located adjacent the slot, the rotatable nut having an opening to receive the cylindrical body, and
a spring nut configured to receive a portion of the cylindrical body,
wherein the rotatable nut is configured to be turned such that when the head of the clamp is aligned with the slot in the first structure, the top portion of the clamp is configured to lower into the opening and clamp the first structure to the second structure, and
wherein the rotatable nut includes a plurality of serrated surfaces located on a top portion of the rotatable nut.

10. A clamp, comprising:
a T-shaped structure comprising:
a head portion configured to be located adjacent a slot in a first structure that is to be clamped to a second structure, the head portion contacting the second structure when the first and second structures are clamped together,
a neck portion coupled to the head portion, the neck portion extending through the slot, in the first structure, and
a cylindrical body coupled to the neck portion, the cylindrical body including first and second pins;
a rotatable nut having an opening to receive the cylindrical body, wherein the rotatable nut comprises:
a collar located in a center portion of the rotatable nut, the collar including surfaces configured to receive the first and second pins; and
a second nut to receive a portion of the cylindrical body, wherein the rotatable nut is configured to be turned such that when the head portion of the clamp is aligned with the slot in the first structure, the head and neck portions are configured to lower into the opening and clamp the first structure to the second structure.

11. The clamp of claim 10, wherein the neck portion includes first and second portions located on opposite sides of the neck portion and wherein the first structure includes depressions located on either side of the slot, the depressions being configured to receive the first and second portions of the neck portion when the first structure is clamped to the second structure.

12. The clamp of claim 10, wherein the second structure includes a lip, and wherein the head portion is configured to contact the lip when the second structure is clamped to the first structure.

13. The clamp of claim 10, wherein the rotatable nut comprises a cylindrical body with a plurality of indentations located around a circumference of the outer surface of the rotatable nut, the plurality of indentations being configured to be gripped by a tool or by hand when rotating the rotatable nut.

14. The clamp of claim 10, wherein the rotatable nut further comprises:
a plurality of serrated surfaces located on a top portion of the rotatable nut.

15. The clamp of claim 10, further comprising:
a spring located adjacent a central portion of the second nut, the spring surrounding at least a portion of the cylindrical body.

16. The clamp of claim 10, wherein the rotatable nut includes a first visual indicator and the second nut includes a second visual indicator, wherein the first and second visual indicators are aligned when the first structure is clamped to the second structure.

17. The clamp of claim 1, wherein the cylindrical body includes first and second pins, and
wherein the rotatable nut comprises a collar located in a center portion of the rotatable nut, the collar including surfaces configured to receive the first and second pins.

18. The clamp of claim 1, wherein the rotatable nut further comprises a stop configured to prevent the rotatable nut from being over-tightened.

19. The clamp of claim 10, wherein the rotatable nut further comprises a stop configured to prevent the rotatable nut from being over-tightened.

20. The clamp of claim 11, wherein the first and second portions are V-shaped.

* * * * *